April 22, 1958      G. K. LAMBERT      2,832,042
FAULT LOCATING APPARATUS
Filed April 30, 1954      2 Sheets-Sheet 1
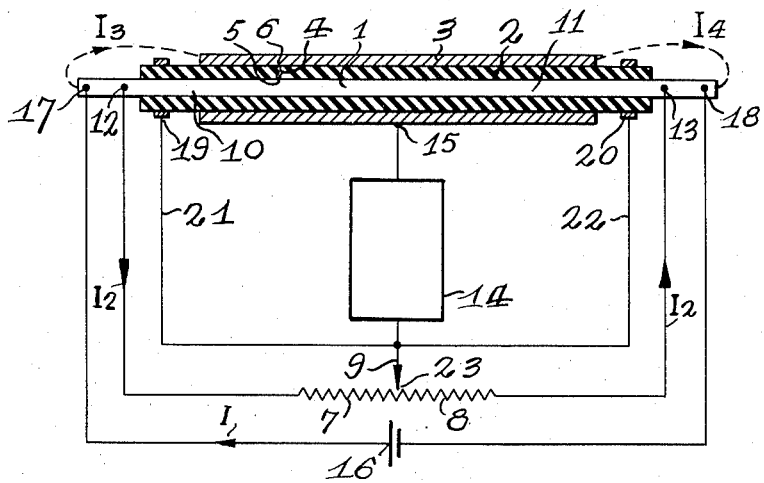
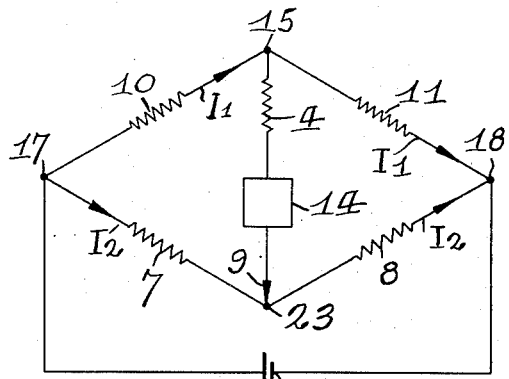 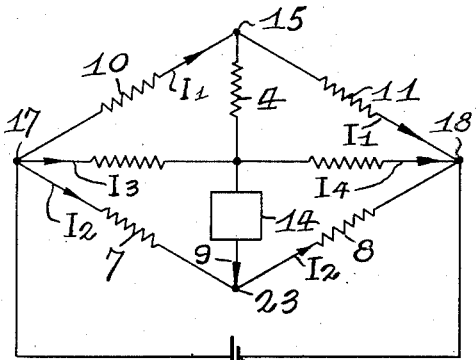
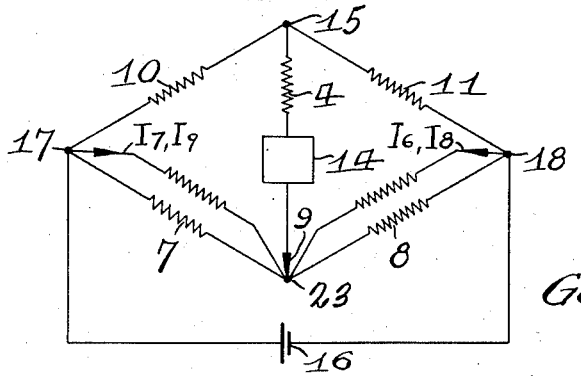
INVENTOR
*Gordon K. Lambert*
BY *Robert B. Harmon*
ATTORNEY April 22, 1958

G. K. LAMBERT 2,832,042

FAULT LOCATING APPARATUS

Filed April 30, 1954

INVENTOR
Gordon K. Lambert

BY Robert B. Harmon

ATTORNEY

United States Patent Office 2,832,042
Patented Apr. 22, 1958

2,832,042
FAULT LOCATING APPARATUS

Gordon K. Lambert, Verdun, Quebec, Canada, assignor to Northern Electric Company, Limited, Montreal, Quebec, Canada, a corporation of Canada Application April 30, 1954, Serial No. 426,808

6 Claims. (Cl. 324—52)

This invention pertains to fault locating and more particularly to the method and apparatus for locating resistance fault in electrical elements.

Devices of the Wheatstone bridge type, as is well known, are employed in the location of faults in electrical elements such as between conductors or between the conductors and metallic sheath. Such devices are suitable for the location of faults of low resistance of the order of a maximum of approximately 50,000 ohms but have been found unsatisfactory for faults having a resistance value above this limit. A difficulty, encountered when the present bridge circuit apparatus is used for locating high resistance faults, is that which is due to the low sensitivity of the detector unit of the bridge apparatus resulting from the low resistance of that unit. A further difficulty is that which is due to errors introduced by the leakage currents flowing through the detector. For these reasons, it has been the practice, when a high resistance fault occurs, to burn down these faults by repeated applications of electrical current. This method, however, of eliminating a fault requires special equipment and is not always successful.

An object of this invention is to provide novel apparatus of the Wheatstone bridge type for locating resistance faults, including those of high resistance, occurring between electrical elements.

Another object of this invention is to provide novel apparatus of the Wheatstone bridge type, having an improved detector sensitivity, for locating resistance faults, including those of high resistance, occurring between electrical elements.

A still further object of this invention is to provide novel apparatus of the Wheatstone bridge type, having improved accuracy over apparatus previously used, for locating resistance faults, including those of high resistance, occurring between electrical elements.

These and other objects of this invention are obtained by providing a Wheatstone bridge device having incorporated therein a guard circuit consisting of additional electrodes which prevent surface leakage currents from flowing through the detector unit, by including the fault resistance within the detector circuit and by providing a detector unit of high resistance.

A better understanding of the invention may be had by referring to the following description of an exemplary embodiment of the invention taken in conjunction with the accompanying drawings, in which like references refer to like parts, in which:

Fig. 1 shows a detailed circuit of the fault locating apparatus in which the invention is embodied;

Figs. 3 to 5 show simplified circuit drawings used in explaining the invention.

Figure 2:
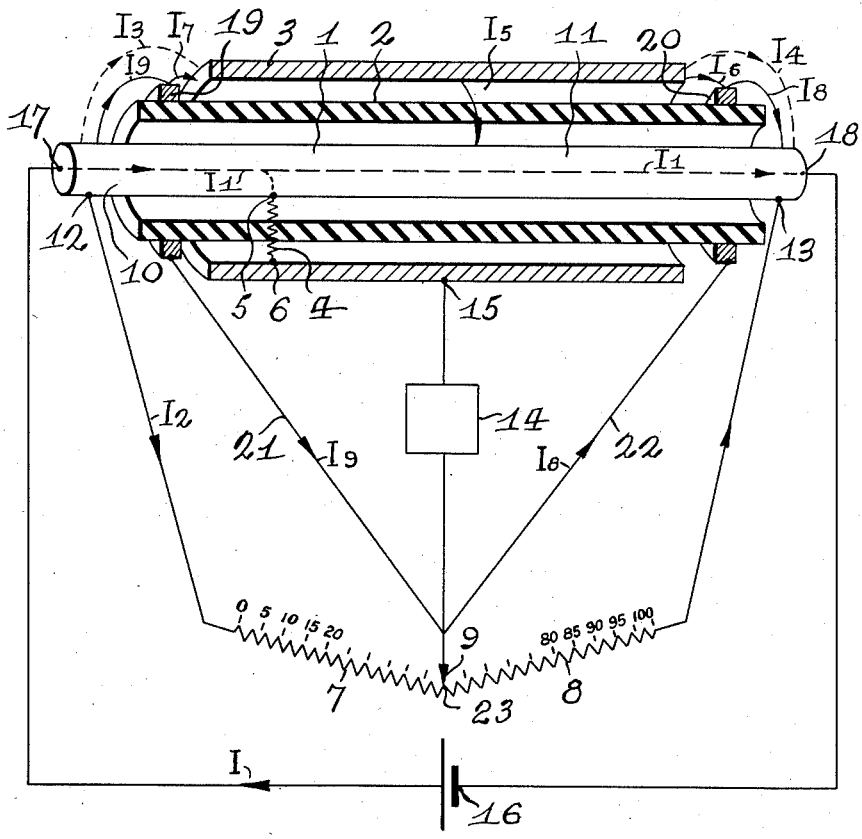
Fig. 2 shows a detailed circuit similar to Fig. 1 in which the elements have been spaced apart for the purpose of explaining the invention.

Considering the drawings, a cable having a conductor 1 insulated with a covering 2, a sheath 3 superimposed thereover and a resistance fault 4 between the points 5, 6 is incorporated for test in a Wheatstone bridge circuit which consists of a pair of ratio arms 7, 8 having a movable contact 9 in slidable relation therewith, a pair of ratio arms 10, 11 formed by that portion of the conductor 1 on either side of the fault 4, the loop being completed by connecting the pairs of ratio arms to the junctions 12, 13, detector 14 having a high input resistance inserted between the contact 9 and the junction 15 or the point 6 by reason of the sheath 3, energizing source 16 connected to the junctions 17, 18, the guard circuit consisting of the electrodes 19, 20 in conducting relation with the covering 2 and electrically connected to the contact 9 by the leads 21, 22 respectively. The junctions 12 and 13 should be located approximately a distance five times the diameter of the conductor 1 from the junctions 17 and 18 respectively in order that current density appearing thereat will be uniform. In order to avoid any potential drop due to contact resistance, it is preferable that the junctions 12 and 13 be soldered joints. It will be observed that the fault 4 appears in series with detector 14. The ratio arms 7 and 8 may be calibrated for convenience for measurements such as the percentage of length of cable to the fault.

In the operation of the apparatus shown in Figs. 1–5 inclusive, the current I divides into the components $I_1$ and $I_2$ the contact 9 being adjusted so that no potential difference exists between the points 5 and 23 the latter being the point to which the contact 9 has been moved at the balance of the circuit as indicated by the detector 14. The bridging circuit may be traced from the junction 12 through arms 10, 11 of conductor 1 to junction 13 for one of the ratio arms and from junction 12 through ratio arms 7, 8 to junction 13 for the other ratio arm.

In the electrical cable shown in the drawings, two leakage currents are present, one being the surface leakage currents $I_3$, $I_4$ as shown in the dotted lines at the ends of the cable and the other being internal leakage current $I_5$ as shown by the full line.

If the resistance of the fault 4 is low as heretofore indicated, then these leakage currents are negligible and do not appreciably affect the balance of the bridge circuit by reason of the fact that the resistance of the fault 4 is considerably less than the surface resistance as exemplified by the surface leakage currents $I_3$, $I_4$. The bridge circuit therefore resolves itself into the simple circuit as shown in Fig. 3.

If, however, the fault resistance 4 is high as heretofore indicated, the leakage currents impart serious errors into the balancing of the bridge circuit since resistance of the fault 4 approaches the leakage resistance, as exemplified by the leakage currents $I_3$, $I_4$, $I_5$, as shown in Fig. 4 with respect to $I_3$, $I_4$, the current $I_5$ being distributed more or less uniformly between the sheath 3 and the conductor 1. These leakage currents flow in part through the detector 14, thus affecting the balance of the bridge.

In order to avoid these errors when the resistance of the fault 4 is high, I provide a guard circuit as heretofore described to overcome the effect of the surface leakage currents $I_3$, $I_4$ and introduce a corrective factor into the reading obtained when the bridge is balanced to correct for the internal leakage current $I_5$. With this arrangement, the leakage currents $I_3$ and $I_4$ are divided into the components $I_8$ and $I_9$ respectively, as shown in Figs. 2 and 5. Since the potential of the electrodes 19, 20 is at the same level as that at the point 23, there is no potential drop, when the bridge is balanced, between the sheath 3 and electrodes 19, 20. Since current $I_9$ flows from electrode 19 through connection 21 to point 23, and current $I_8$ flows from point 23 through connection 22 to electrode 20, neither flows through the detector 14 and thus do not affect it. By making the arms 7 and 8 of low resistance, approximately 1000 ohms being suitable, the current $I_2$ is made relatively large with respect to the leakage currents $I_8$, $I_9$. The effect of these leakage currents on the potential of point 23 can therefore be neglected and the bridge accuracy is unaffected by them.

The result obtained on balancing the bridge current can be improved by adjusting it for the internal leakage current $I_5$ by applying the following correction:

$$x = \frac{yr - \frac{1}{2}R}{r - R} \times 100\%$$

where $x$ = true distance from cable end to fault expressed in percent of the total cable length.

$y$ = distance from cable end to fault expressed in percent of the total cable length indicated by the fault locating apparatus.

$r$ = insulation resistance of the faulted conductor in megohms. (This may either be calculated from the cable dimensions, or preferably, measured on a similar conductor in the same cable.)

$R$ = apparent fault resistance in megohms. (This consists of the true fault resistance in parallel with the insulation resistance of the faulted conductor.)

It should be noted that the quantities "$r$" and "$R$" must both be measured after the same period of electrification which must also be used in operating the fault locating apparatus. That is, if a period such as, say 2 minutes, is used in measuring "$r$" and "$R$," the position of the fault indicated by the fault locating apparatus ("$y$") must be read 2 minutes after the battery is connected to the faulted conductor. This procedure will avoid errors arising from dielectric absorption.

The inclusion of the resistance fault 4 in series with the detector 14 maintains stability in adjusting the bridge circuit when locating faults having a varying resistance. In order to compensate for loss of sensitivity due to this inclusion of the fault resistance, a detector with a high input resistance is used.

It will be apparent that the connections to conductor 1 and electrodes 19 and 20 may comprise the unaffected conductors either in the faulted cable or in an adjacent cable.

While I have described a specific embodiment of my invention, it will be apparent to those skilled in the art that my invention may be employed for the location of resistance faults between other electrical elements of different structure such as, for example, faults between conductor and earth and faults between conductor and conductor, in which case one of the conductors is connected into the circuit in place of the sheath 3.

What is claimed is:

1. In a system for locating high resistance faults between the outer sheath and the conductor of an electric cable having insulating material therebetween comprising in combination a resistance element and a movable contact therefor capable of dividing the resistance element to form a pair of resistance arms for a Wheatstone bridge, the conductor being so divided that the portions on either side of the fault form the other pair of the ratio arms of the bridge, means to form a junction of the pairs to complete the loop for the bridge, means for applying a D. C. potential across the balancing arms of the bridge circuit, a detecting means interposed between the contact and the resistance fault, a conductive electrode disposed at each end of the cable interposed between the conductor and sheath and in contiguous relation with the insulating material, means for maintaining the electrodes at the same potential as the sheath.

2. In a system for locating high resistance faults between the outer sheath and the conductor of an electric cable having insulating material therebetween comprising in combination a resistance element and a movable contact therefor capable of dividing the resistance element to form a pair of resistance arms for a Wheatstone bridge, the conductor being so divided that the portions on either side of the fault form the other pair of the ratio arms of the bridge, means to form a junction of the pairs to complete the loop for the bridge, means for applying a D. C. potential across the balancing arms of the bridge circuit, a detecting means interposed between the contact and the resistance fault, a conductive electrode disposed at each end of the cable interposed between the conductor and sheath and in contiguous relation with the insulating material, said electrodes being connected to the movable contact.

3. In apparatus in accordance with claim 1 in which said detecting means comprises a device having a high input resistance.

4. In a system for locating high resistance faults between a first and second electrical conductor element of a transmitting means having in combination a resistance element and a movable contact therefor capable of dividing the resistance element to form a pair of resistance arms for a Wheatstone bridge, the first of the elements being divided so that the portions on either side of the fault form the other pair of the ratio arms of the bridge, means to form a junction of the pairs to complete the loop for the bridge, means for applying a D. C. potential across the balancing arms of the bridge circuit, a detecting means interposed between the contact and the resistance fault, and a conductive electrode disposed at each end of the transmitting means in contiguous relation with the first element and interposed between the elements, means for maintaining said electrodes at the same potential as the second element.

5. In a system for locating high resistance faults between a first and second electrical conductor element of a transmitting means having in combination a resistance element and a movable contact therefor capable of dividing the resistance element to form a pair of resistance arms for a Wheatstone bridge, the first of the elements being divided so that the portions on either side of the fault form the other pair of the ratio arms of the bridge, means to form a junction of the pairs to complete the loop for the bridge, means for applying a D. C. potential across the balancing arms of the bridge circuit, a detecting means interposed between the contact and the resistance fault, and a conductive electrode disposed at each end of the transmitting means in contiguous relation with the first element and interposed between the elements, means for maintaining said electrodes at the same potential as the second element, the electrodes being connected to the movable contact.

6. In apparatus in accordance with claim 2 in which said detecting means comprises a device having a high input resistance.

References Cited in the file of this patent

UNITED STATES PATENTS

| 1,905,412 | Kasson | Apr. 25, 1933 |
| 1,916,304 | Edwards | July 4, 1933 |
| 2,120,391 | Butterfield | June 14, 1938 |
| 2,460,688 | Gambrill | Feb. 1, 1949 |